US006901272B2

(12) United States Patent
Isham

(10) Patent No.: US 6,901,272 B2
(45) Date of Patent: May 31, 2005

(54) ERGONOMIC SYSTEM FOR CONTROL OF DEVICES THROUGH PORTABLE WIRELESS TERMINALS

(75) Inventor: Karl Michael Isham, Grantsville, UT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 618 days.

(21) Appl. No.: 09/739,474

(22) Filed: Dec. 18, 2000

(65) Prior Publication Data

US 2002/0077114 A1 Jun. 20, 2002

(51) Int. Cl.$^7$ ................................................. H04B 1/38
(52) U.S. Cl. ..................... 455/566; 455/552.1; 455/557
(58) Field of Search ............................ 455/566, 552.1, 455/557, 556.1; 345/157, 5

(56) References Cited

U.S. PATENT DOCUMENTS

| | | | |
|---|---|---|---|
| 5,937,041 A | 8/1999 | Cardillo, IV et al. | 379/93.25 |
| 6,104,334 A | 8/2000 | Allport | 341/175 |
| 6,119,155 A | 9/2000 | Rossmann et al. | 709/219 |
| 6,557,016 B2 * | 4/2003 | Tanigawa et al. | 715/501.1 |
| 2002/0173721 A1 * | 11/2002 | Grunwald et al. | 600/437 |

FOREIGN PATENT DOCUMENTS

| | | | |
|---|---|---|---|
| EP | 0883313 A2 | 5/1998 | H04Q/7/22 |
| EP | 0938052 A2 | 2/1999 | G06F/17/30 |
| EP | 0964590 A2 | 6/1999 | H04Q/7/22 |
| WO | WO0004427 | 1/2000 | G05B/15/00 |

OTHER PUBLICATIONS

The Computer Journal vo. 42, No. 6 1999 pp. 534–546 see heading 3.3.4.

* cited by examiner

Primary Examiner—Temica M. Beamer
(74) Attorney, Agent, or Firm—Gregory L. Thorne

(57) ABSTRACT

A network protocol allows small wireless devices to be used for the control of remote systems. Several features promote fast and efficient modification of system parameters despite the small form factor of most wireless devices. First, each card is preferably designed such that the status of a control variable, and a control to permit the variable to be changed, are located on the same card. Second, the menu is structured such that rather than forcing the user through a series of data entry cards for every possible parameter, the user may select only the parameter which requires changing. Third, the interface is structured such that, each time a control variable is set, the user is taken back automatically to the previous card up one level in the menu structure. Fourth, the interface is structured to go back a level when the user opts out of a change. Fifth, when a change is applied and if successful, control returns to the deck from which the change was implemented at its entry point rather than the point at which the change was implemented. Sixth, context is illustrated by displaying status data over multiple levels.

11 Claims, 5 Drawing Sheets

US 6,901,272 B2

ERGONOMIC SYSTEM FOR CONTROL OF DEVICES THROUGH PORTABLE WIRELESS TERMINALS

BACKGROUND OF THE INVENTION

1. Field of the Invention

The invention relates to the entry of control commands through portable wireless devices to remote systems.

2. Background

An embedded system is a computer. But rather than sit on a desktop, office, or research facility and run all manner of computer applications, embedded systems perform specific real-world applications like controlling complex broadcast systems, reading bar codes, printing postage stamps, or routing data over the Internet. Being so specialized, such computers may lack the usual keyboard/mouse/monitor interfaces, unless the systems they control are very complex, in which case, such an interface is used to provide "soft-key" controls and readouts for the many parameters of interest.

The desire to provide remote access to such systems, to allow them to be "unmanned," has been recognized for some time and several solutions are known. Remote access is attractive because it allows the systems to be monitored and controlled from a geographical location outside the facility where the equipment is installed and otherwise controlled. Remote access is most desirable when such equipment is inaccessible due to terrain, convenience, or as a result of an unpredicted lack of personnel such as due to absenteeism or a crisis. (There is a story of a broadcast system that was suddenly abandoned, due to a gunman, while it was still broadcasting live creating a sudden need for remote control to keep the broadcast on-line.) Also, as a matter of convenience and economy, the monitoring of mission-critical equipment by "on-call" personnel is considerably more practical when supervisors do not have to be physically present at the facility. Fault isolation by field service personnel may be more timely and efficient when electronic service calls can be substituted for a personal visit. Emergency access is a key concern of remote access. In emergency situations, a facility may need to be evacuated even while its equipment needs direction to function without interruption. Examples of these mission-critical facilities are broadcast studios with air-time commitments, manufacturers of sensitive or dangerous chemicals or components, security intensive installations, and Internet service providers.

Current methods of providing remote access to commercial or industrial embedded systems involve a variety of techniques. A common approach is via a dial-up connection through a modem over standard phone lines. For critical equipment, a phone line may be leased to provide a dedicated, guaranteed connection, or to provide access for continuous monitoring. Once a connection is established with the remote equipment, using either kind of connection, communication is usually conducted using a serial protocol the equipment is designed to understand and respond to.

A more modern mechanism for interfacing with embedded systems is through remote access via a local access network (LAN), wide area network (WAN), or the Internet. This may utilize Internet protocols for control, and status. Information is transferred between the remote control/monitoring station and the embedded system by packets, for example using the Internet protocol (IP). Another packet protocol that has gained favor for such systems is simple network management protocol (SNMP) has gained wide favor for monitoring and controlling the collections of devices that comprise a network infrastructure.

The growth of Internet technologies has enabled a remarkably successful method of remote access using the HTTP protocol and a Web browser. HTTP, is a protocol that runs on top of IP and is used for the world wide web (WWW). To access HTTP enable devices, a user need only supply the uniform resource locator or URL (or IP address) to a Web browser. The embedded system acts like a web server and returns a web page with information, controls (like check boxes, text boxes, and radio buttons), text data providing status, graphs, etc. just like a web page. The Web page from the embedded system device may be written in Hyper Text Markup Language (HTML), the basic language used for familiar web pages. It may display the current status of the equipment and provide graphical forms to allow a user to update control values. When the user submits a completed form, a URL is returned to the equipment with parameters reflecting the updated parameter values embedded in a request string. The embedded equipment then acts on the request through a Common Gateway Interface (CGI) or with a Request Processing Module (RPM). Once the control request is processed, the updated state of the equipment is returned to the user's Web browser as another Web page. Thusly, content is supplied dynamically from the embedded system. The content may be, for example, a snapshot of the state of the device when the HTML response was generated. Put simply, the embedded system is controlled by sending data to the embedded system in the same way a web page form sends data to a web server. Instead of simply updating information in a database at the server, the embedded system makes the data sent to it available to the control system which then causes the embedded system to change its settings.

While most remote access methods require the operator to be wired to the equipment, some forms of access, especially emergency system access, may be better served by a wireless connection. Wireless control methods are available, but are limited due to the complexity of a two-way radio link, and the size limitations of typical mobile control devices. The simplest of these mobile control devices utilize a cell phone with recorded or synthesized voice status and dial-tone push button (dual-tone multi-frequency or DTMF) control. Anyone who has navigated a voice-mail system with a touch-tone phone is familiar with the shortcomings of wireless phones as control devices. Wireless local networks are available, but are by their nature an extension of the facility's control network, and not intended for use very far from the confines of the equipment room.

For the purposes of this invention, technology now exists to extend the World Wide Web to wireless devices. But, this technology has not yet been employed for the control of commercial or industrial embedded systems. Current wireless remote access techniques lack the features enjoyed by wired access. Specifically, wireless control devices tend to be custom-built and limited in operating range from the facilities to which they have access. The control interfaces of these devices are also limited in terms of how easily they may be upgraded and expanded in terms of functionality. Solutions that use a widely accepted control paradigm that is inherently flexible may also require training to operate. Also, the wireless control device cannot be used for other applications. Above all, the cost of such systems is usually prohibitive since these devices do not approach the mass-market volumes required for favorable pricing. Consequently, the most widely used wireless remote access solution involves calling another operator at the facility with a cell phone. This does not satisfactorily address situations where access is impossible due to geographic or weather isolation, and especially crisis situations where the facility must be evacuated.

SUMMARY OF THE INVENTION

This invention provides a user interface paradigm for remote control on portable terminals. The invention provides a method and interface that is particularly suitable for remote access to an embedded system using the capabilities available on data-capable wireless phones. The controlling device may be a consumer grade digital cell phone. The wireless data services they connect to are readily available nation-wide from several providers. An intuitive, fast, and ergonomic user interface permits an operator to not only assess the status of the remote device, but also directly control the equipment of interest.

The interface uses certain elements already employed for wireless web access. The range of control is limited only by current cellular service areas and the Internet itself. Finally, the method is readily applicable to all embedded systems currently capable of functioning as web servers.

The benefits of this invention include the ability to provide remote access to a wide variety of embedded systems inexpensively, and with little additional training or dedicated hardware. Consider the utility of a device that is already likely to be carried by supervisory personnel already: a cell phone. During an emergency, the supervisor may simply connect to the system in question using the cell phone and directly perform whatever control actions the situation calls for.

This invention relies on the capabilities built into data-capable wireless telephones, which have access to a wide array of digital services through nationwide service providers such as Sprint and AT&T. In an embodiment of the invention, the phones run software developed by Unwired Planet, Inc., and are known as UP-enabled phones or UP.Phones. These phones use the data capabilities of conventional wireless phone networks to connect to the World Wide Web through UP.Link servers maintained by the cellular service provider. The phone acts as a web browser, in that the user may press various buttons on the phone to request URLs and navigate through the resulting content. UP.Phones cannot display standard web pages directly because of the obvious limitations in the size of the screen. Instead they browse specially prepared web pages written in an open language known as Handheld Device Markup Language (HDML) which is a specification that is specifically written for the small screens and limited key sets of cell phones and other small wireless devices. HDML applications run on web servers just like the ones that generate (serve-up; "serve-up" being a euphemism for content delivered by a server to a client) HTML. HDML web-servers handle requests from a UP.Link server and serve-up content in HDML format. The HDML services currently available on the Internet provide online stock, weather and news updates, and provide a few portals for some e-commerce.

To permit an embedded system to be accessed by a UP.Phone, the embedded system's HTTP server need only be modified to provide HDML services and content appropriate to the control of the system. An HTTP server of an embedded system would already be capable of such control using HTTP sent over the Internet to a standard web browser. This invention, in essence, extends its capability to act as an HDML service and connect with the wireless web with a control interface appropriate to commercial or industrial equipment.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
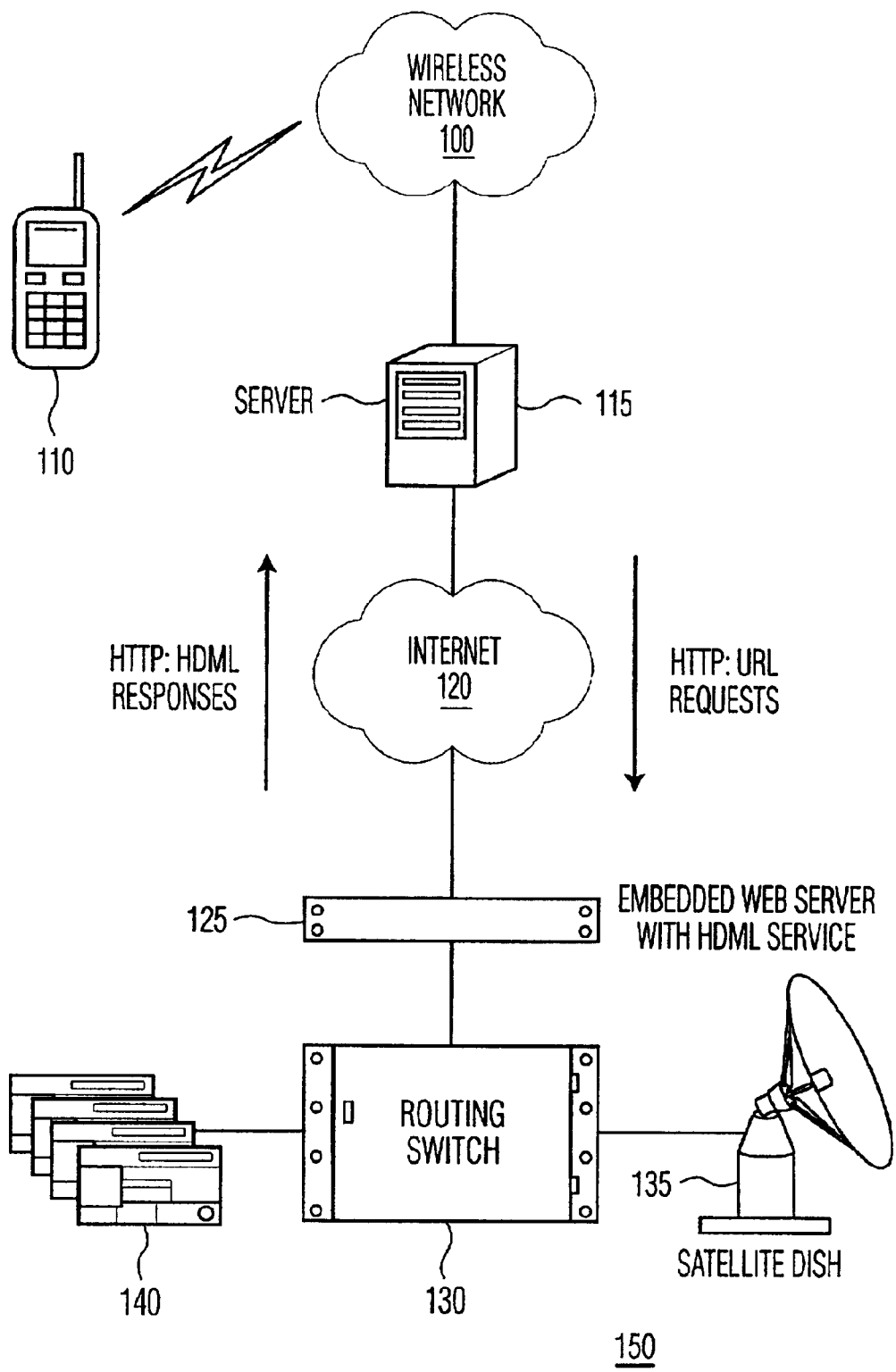
FIG. 1 is an illustration showing how an embedded system is connected to a UP enabled device.

Referring to FIG. 1, embedded systems 150 are connected to UP-enabled devices, for example, a cell phone 110. A user presses buttons on the UP-enabled cell phone 110 to send a URL over the wireless network 100 to a UP.Link server 115. The Up.Link server 115 then converts the request into HTTP requests and sends the request over the Internet 120 to the embedded system's 150 embedded web server 125. The embedded web server 125 responds to the request by reading the current state of its attached equipment and responds back to the UP.Link server 115 using HTTP- and HDML-encoded content. The UP.Link server 115 then relays the response back to the cell phone 110, permitting the user to view the content presented according to rules established by HDML.

Control is exercised over the embedded systems 150 when the embedded systems 150 are modified such that certain data transmitted by the user result in actions being performed, not simply content to present or store in a database. (In fact, it is possible that the data is only stored in a database, because such a database may be accessed by the controlled embedded system 150 regularly or by an event processor to update its values and to receive data from the embedded system 150 representative of its current status.)

Substantially, the action of the embedded system 150 is much like its operation while serving up standard web pages for wired remote access. Content is supplied dynamically from the embedded system 150 that captures a snapshot of the state of the equipment when the response is generated.

Control is exercised by interpreting the URL issued in the HTTP request to the embedded system 150 as a control action. Query strings that accompany the URL represent actions and parameters for control of the system. Only, the embedded web server 125 need be modified to supply content to the user as HDML instead of HTML. Also, the content must generate a user interface that is appropriate for user input on the smaller wireless control devices. This is a significant departure from prior control interfaces used with larger screens and represents a significant challenge given requirements of speed and efficiency of use.

To act as an HDML service, the embedded web server 125 must identify content sent to it as HDML rather than HTML, its normal protocol. The specifics of how this is done differs, depending on the type HTTP server present on the embedded web server 125, but always involves configuring the embedded web server 125 to support the proper MIME types for HDML. For the Wind Web Server, which is the embedded web server offered by Wind River Systems, this is done for static web pages by adding the entries {"HDM", "text/x-hdml"} and {"HDML", "text/x-hdml"}, in the httpMime-SuffixTable (found in the file httpglob.c). For dynamic content produced by Request Processing Modules (RPM) of the Wind Web Server, the function mimeContentTypeSet must be called with the MIME type set to "text/x-hdml" to generate the proper tags for the HTTP response header (i.e. httpMimeContentTypeSet(pReq, HDR OUT, "text/x-hdml");).

Once the MIME type has been properly set, the embedded web server 125 is free to supply content to the UP.Phone using the rules and syntax established for HDML. However, since the objective of remote access is to extend control over an embedded system, the interface that uses HDML must provide for control actions despite the small screen size and limited command buttons of the cell phone 110. Referring to FIGS. 2A, 2B, 3 and 4, an example embodiment of a user interface for remote control is defined for purposes of controlling a crosspoint router of a broadcast facility, which controls the routing of video and audio content produced by the facility from their sources to their respective destinations. These figures illustrate key design features found to be important for efficient control of an embedded system.

Figure 2A:
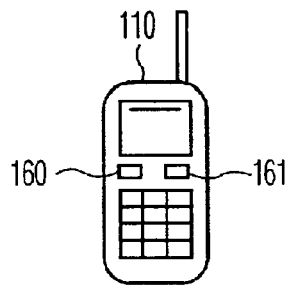
FIG. 2 is a flow chart that shows a sequence of events in navigating login screens on a wireless terminal according to an embodiment of the invention.
Figure 2B:
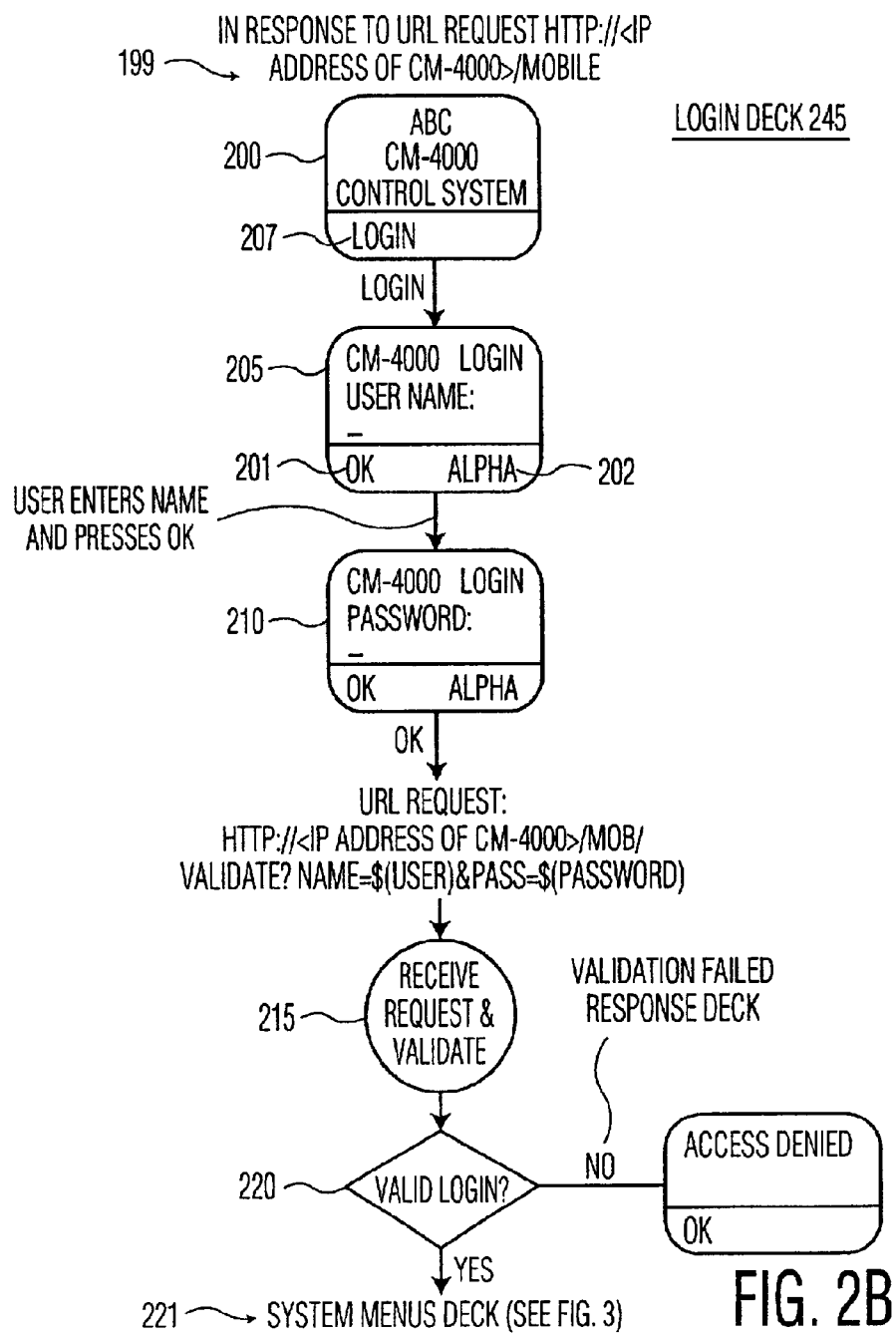

Referring particularly to FIGS. 2A and 2B, in the environment of UP.Phones, cards 200, 205, 210, and 225 are analogous to the screens or pages of a web site. The bottom of each card displays text, called soft keys 201, 202, immediately over hardware keys 160 and 161 on UP.Phones such as cell phone 110 to indicate the function of the hardware keys 160, 161. A deck is a collection of cards, that are loaded onto the phone by the embedded web server 125 in response to a URL request. Thus, instead of a potentially long web page with a great deal of text, graphics, and controls on it, the embedded web server 125 sends a deck of cards. Thus, scrolling through a long web page can be regarded as analogous to flipping through a deck of cards 200, 205, 210, and 225. Illustrated in the figures is one of a variety of possible screen sizes. For this screen size, the card 200, 205, 210, and 225 has four lines, for displaying content and soft-keys 201 and 202 visible at the bottom of, for example, the login card 205.

A login deck 245 is loaded into the phone following a "mobile" URL request 199. A keyword "mobile" in this case corresponds to the "index page" of many web servers. The request 199 may be stored in the cell phone 110 according to the prior art or any other suitable means or it may be entered manually. The ACCESSDOMAIN for the login deck 245 is restricted to the user's service provider. The user is presented with a login card 200 and given the option to proceed by pressing a login soft key 207. The phone immediately responds by displaying a login card 205 which allows the user to enter a user name and password (using any suitable text entry device for cell phones 110 or other wireless devices such as 2-way pagers and wireless terminals). (Note: To avoid cluttering the drawings, the softkeys are not further labeled since they are consistently shown in the same place on the respective cards.) An alpha soft key 202 may be used to facilitate text entry. Upon pressing an OK softkey, the user name and password are returned to the system in a URL that contains a query string containing the user's entries. Also included in the HTTP request header by the UP.Link server is a subscriber ID assigned to the wireless device by the wireless network provider. All of this information is validated against a database maintained on the embedded web server to authenticate the login request.

If the user name, password, and subscriber Id are all valid 215, 220, the embedded web server 125 responds by sending a menu deck (e.g., systems menu deck 345 in FIG. 3) to the phone 221. If validation fails, then an access-denied display card 225 is sent to the phone announcing the failure. Note that it is not particularly useful for the access-denied display card 225 to be transmitted with the login deck 245 because a response is required from the server, but it could be. When the user acknowledges a login failure by pressing the OK soft key, the previously entered password and user name may be erased and the user returned to the login card 205. Note also that the login card 200 may be the only card in the entire application that will permit a bookmark, to minimize unauthorized access.

Figure 3:
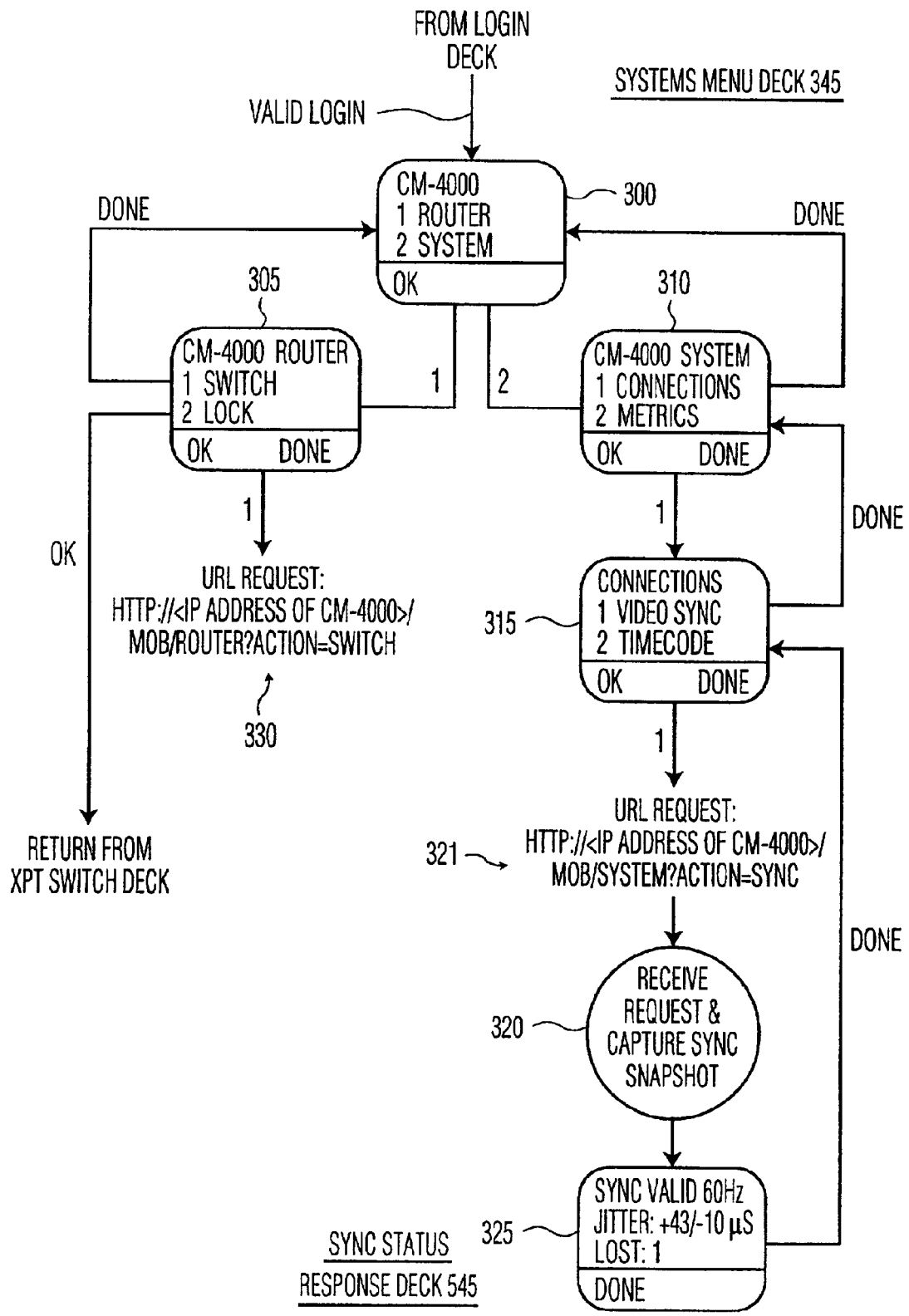
FIG. 3 is a flow chart that shows a sequence of events in navigating parameter display screens on a wireless terminal according to an embodiment of the invention.

Referring now to FIG. 3, a systems menu deck 345 is loaded as indicated in FIG. 2. The systems menu deck 345 is sent to the phone by the embedded web server 125 once login parameters submitted by the login deck 245 have been validated. The functions available for control in the system may be viewed as having a tree structure, with the system menu at its root. The menus are the branches of the tree and specific actions or equipment status reports are the leaves of the tree. It is important to load all of the possible menus into a single deck or digest. This minimizes the time required for the cell phone 110 to respond to user selections, since as many possible results are already loaded into the cell phone 110 after login.

The current status of the embedded system 150 may be a function of the states of many subsystems, components, programs, etc. In some cases, a problem may be isolated by navigating among these status cards. In the broadcast control system of the current example embodiment, a supervisor may be allowed to assess the state of key signal connections such as SMPTE Timecode and Video SYNC. Since these signals have a direct bearing on the capabilities of the embedded system. For example the remote control of a cross-point switch 130 of a broadcast system may require the diagnosis of the reason a certain source failed to air. The cards 300, 305, 310, 315, and 325 shown in FIG. 3 are primarily for selecting a particular subsystem and viewing its state. A few such "read-only" system state functions are shown in FIG. 3, as representative of the many possible equipment states that may be viewed remotely. The systems menu deck 345 is entered through a header card 300 which breaks down the large number of subsystems at a high level, in this case identifying one branch as the "Router" and the other branch, the "System." If the user chooses "1," a router control card 305 is displayed and the user is given the choice of switching the router or locking it. If the user chooses "1"

a URL 330 is sent to the embedded web server 125 to load a switch deck 445 (FIG. 4) from the embedded web server 125. Otherwise, if the user chooses "2" from the header card 300, a system header card 310 is displayed and the user is given the option of viewing connections or metrics. If the user chooses "1", a connections card 315 is displayed by the cell phone 110 and the user is presented with the options for viewing video sync data or a time code. If the user chooses "1," a URL request is generated 321 to retrieve the corresponding data 320. In this case, the requested data may involve many different pieces of information. In the present example, a large number of data are retrieved, each being selectively displayable by selecting the appropriate display card. In the present example, a sync status deck 545 contains only a single card 325, but the sync status deck could contain many organized according to a tree structure with each display card being selectable through a menu and all data being displayed by a local process, the data values having been retrieved with a particular deck.

Figure 4:
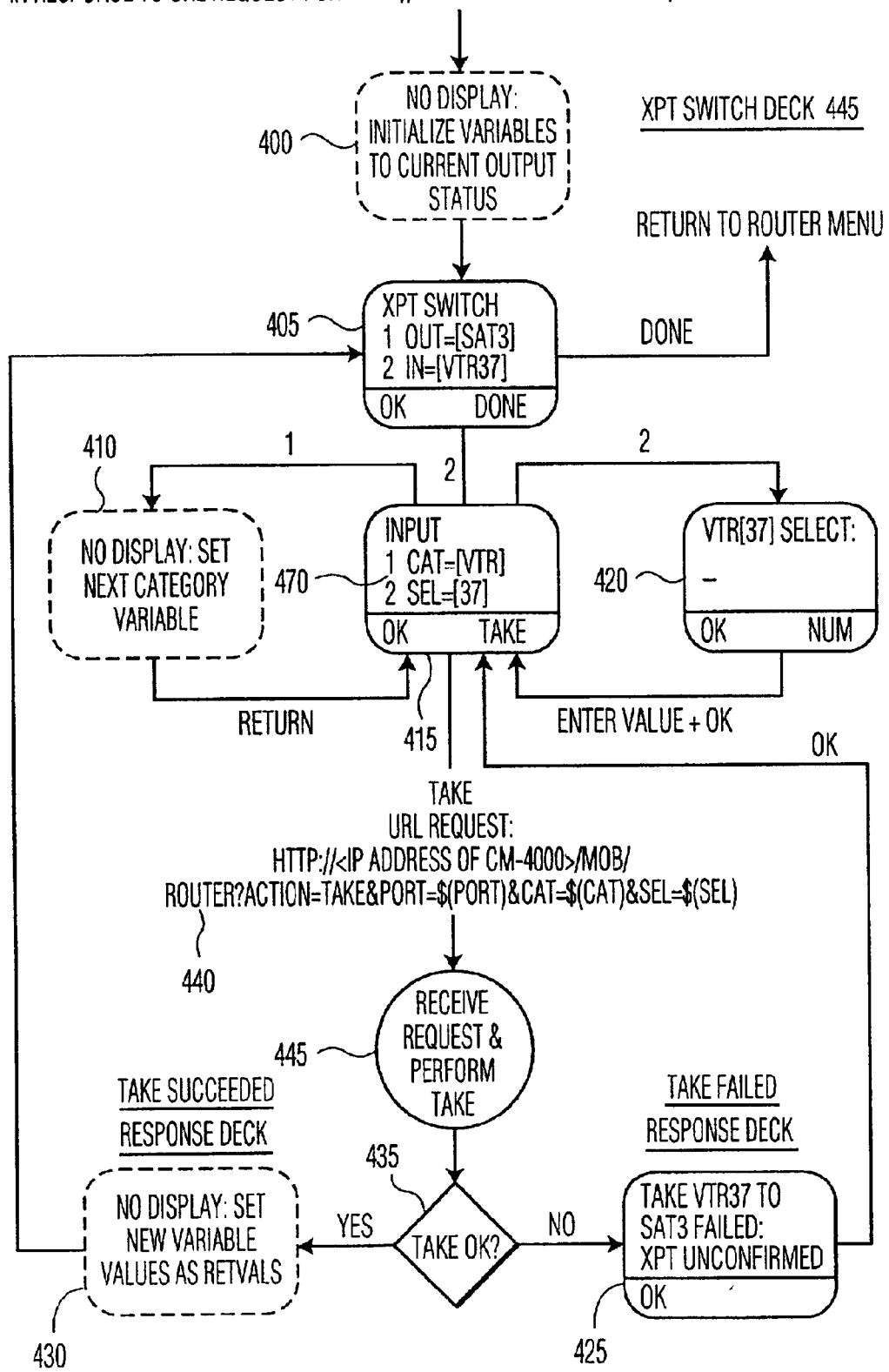
FIG. 4 is a flow chart that shows a sequence of events in navigating parameter control screens on a wireless terminal according to an embodiment of the invention.

Referring now also to FIG. 4 a sequence of display cards and possible responses for control over a broadcast control system's crosspoint switch 130 begins with a crosspoint (Xpt) switch deck 445. This is sent to the phone by the embedded web server 125 following the switch selection 330 from the router card in the menu deck 345. As previously, the entire crosspoint switch deck 445 is loaded at once into the cell phone 110 to minimize delay due to network traffic.

The crosspoint switch deck 445 has several features specifically designed for active equipment control. First, each card is preferably designed such that the status of a control variable, and a control to permit the variable to be changed, are located on the same card. Second, the menu is structured such that rather than forcing the user through a series of data entry cards for every possible parameter, the user may select only the parameter which requires changing. Third, the interface is structured such that, each time a control variable is set, the user is taken back automatically up one level in the menu structure. Fourth, the interface is structured such when the user opts out of a change in a control variable, the user is taken back one level in the menu structure. The third and fourth rules are significant departures from HDML interface mechanics which are generally static when a control is changed and generally take the user back to the previous card when the [CLR] button is pressed. Fifth, when an "Apply" is implemented (meaning one or more variables defined in a deck is/are modified and the new values ready to be sent to the system), and successful, control returns to the deck from which the Apply was implemented at its entry point rather than the point at which the Apply was implemented. As discussed below, structuring control in the above fashion minimizes the time and disorientation that can attend the rather parsimonious screen size and control buttons used on portable appliances such as cell phones 110. Sixth, to help keep the user from losing his/her place in complex menu trees, the current values of selectable parameters variables are shown in the card that presents the control that permits the user to modify the variable. For example, rather than present: "Select 1 to modify input or 2 to modify output," the user is presented with "Select to modify input=Dev. A or 2 to modify output=Dev. J." This allows more than one control to be shown at a given level of the menu hierarchy while still juxtaposing the control option with the current status value. Note that on the tiny screen, the above quoted language would be substantially abbreviated.

In the example, of FIG. 4, a first card 400 in the deck is a non-display card indicating an initialization of variables is taking place. A crosspoint switch card 405 shows the status of a currently selected output and input of a circuit in the crossover switch. From here the user may select to change either the output or the input independently. Once an input or an output is selected, the user is presented with a selection deck that allows the independent change of either the device category, or its selection number within the category. For example, if the user selects "2" the input selection process begins with the display of an input card 415. The input card 415 shows the type and ordinal pointer designating the input of the currently selected circuit selected in the crosspoint switch card 405. A similar sequence of cards would be used if an output were selected for modification by selecting 1 during the display of the crosspoint switch card 405. The crosspoint switch card 405 indicates a useful feature that may be implemented. As discussed above in connection with the design elements for control systems, this is an example of the rule that whenever user input is collected from an input form in a sub-activity, the essential details from the main activity are displayed as a cue to the user; usually in the title of the card. For example the title "Input" on the input card 415, and "VTR[37] Select" on a select card 420. This lets the user know what they initiated by the selection on the previous card. Here, the category of device is shown and the selection number for the input on the input card 415 used to indicate which one is to be modified. The current selection is highlighted by bracketing, but other types of highlighting could be used (although brackets are the standard HDML style). If the user selects "2" during display of the input card 415, a device select card 420 is presented and the user is given the ability to enter a new device.

In the case of the device category 470, the number of values that can be selected is small, so rather than present the user with a separate data entry card such as device select card 420, the current category simply rotates through a list. The no display card 410 represents this cycle. As the user repeatedly presses a single button (numeral 1), the category cycles from value to value until the desired value is displayed within brackets. It is ergonomically easier for a user to rapidly press the same button multiple times rather than to find and press the buttons that matches a specific menu item, even though the latter may involve fewer activations of a control.

Note that on the device select card 420, the current status of the device remains displayed. To change the selection number, the user is taken to a data entry form. As emphasized before, the information pertinent to the main activity may be displayed on the data entry card to help the user maintain context. In this case, it's the category and selection with the selection bracketed in recommended HDML style to indicate it's the value subject to change.

Once the user has changed the category and/or selection, the Apply soft-key may be pressed to update the corresponding parameters of the remote embedded system 150 by sending a URL 440 that contains a query string with the value of the port (input or output), the category, and the selection. At the embedded system 150 embedded web server 125, the Apply is implemented at 446 and if successful (determined by the embedded system 150 and embedded web server 125 as indicated at 435) then the crosspoint switch card 405 is displayed once again with the new status of the system.

An input is always taken with respect to an output, so a table of subscribers is maintained on the equipment that records the current output that the user has selected. If an input is changed, it always refers to this selected output. If an output is selected for change, then the new value is recorded for the subscriber, effectively changing the user's output focus. If the Apply was successful (either the output focus was changed to a valid router output, or the focal output crosspoint was physically switched to the new input) then the current status of the router is returned to the wireless device. This is accomplished by sending a No-Display card to the phone that contains the current status of the router output set into HDML as variables. The function of this card is to provide a return function to the previous deck that made the Apply request. The return carries the update values of the relevant variables back to the cell phone 110 through RETVAL constructs, which are part of HDML. Again the card that is displayed is the point where the first activity was initiated from the deck and displays the new values. If the Apply fails on the host equipment, then a new deck 425 is sent to the cell phone 110 to indicate this. When the user acknowledges the failure, the user is returned back to the activity where the Apply was initiated, i.e., the input card 415.

Using RETVALs to refresh the router data, rather than issuing a completely new deck, accomplishes two things. First, the time to transmit the new information to the wireless device is minimized, because only a single No-Display card is used. Second, because the phone's history stack is not disrupted by not explicitly reloading the entire deck, the navigational model—the logical progressing of forward and backward movements through the deck—is perfectly preserved. Note also that throughout this deck it is possible to avoid presenting more than some fixed (two in this case) possible selections. In the present embodiment, limiting the number to two is preferable in some embodiments.

By this mechanism the user is "taken back one level in the menu structure." A developer would normally send a status card back to the phone with the indication of the status after the control action had been applied to the system. To get back to where the control was initiated (crosspoint switch card 405) from this card, however, the user would have to ESC back to card 415, and then back to the crosspoint switch card 405. This is the order imposed by the normal history stack, but it is cumbersome because it requires the user to change multiple things in succession. A designer could use a card with a GOTO construct, but it would affect the history and fail to match what the user most-likely expects to see. With a GOTO, the user would find him/herself back at the crosspoint switch card 405, but now if the user pressed ESC again, he would go back to the input card 415. Anytime the user is at the crosspoint switch card 405 and presses ESC (or [CLR]), he/she would reasonably expect to end up at the router control card 305. So, there is a difference between what the user logically expects the history (stack) to be and what it is according to traditional HDML.

To address this discrepancy the input card 415 is called from the crosspoint switch card 405 with a GOSUB to make it a subactivity. The input card 415 is also specified to its NEXT construct point to the crosspoint switch card 405. A NoDisplay card is returned to the phone with the status encoded as RETVALS and its TASK as a RETURN. The NEXT construct in the input card 415 requests the crosspoint switch card 405 automatically when the subactivity returns. Values returned to the phone in RETVAL constructs are "passed" through each card back to the crosspoint switch card 405, where they are displayed. From the user's point of view, this looks like they initiated an Apply on the input card 415, and the next thing that appears is the crosspoint switch card 405 with fresh values. If they then press ESC, then they are taken back to the router control card 305, just as they would expect. By using subactivities with RETVALS, RETURN and NEXT, the history stack of the phone is preserved because the user "backed over" the returned status card and input card 415 automatically.

Figure 5:
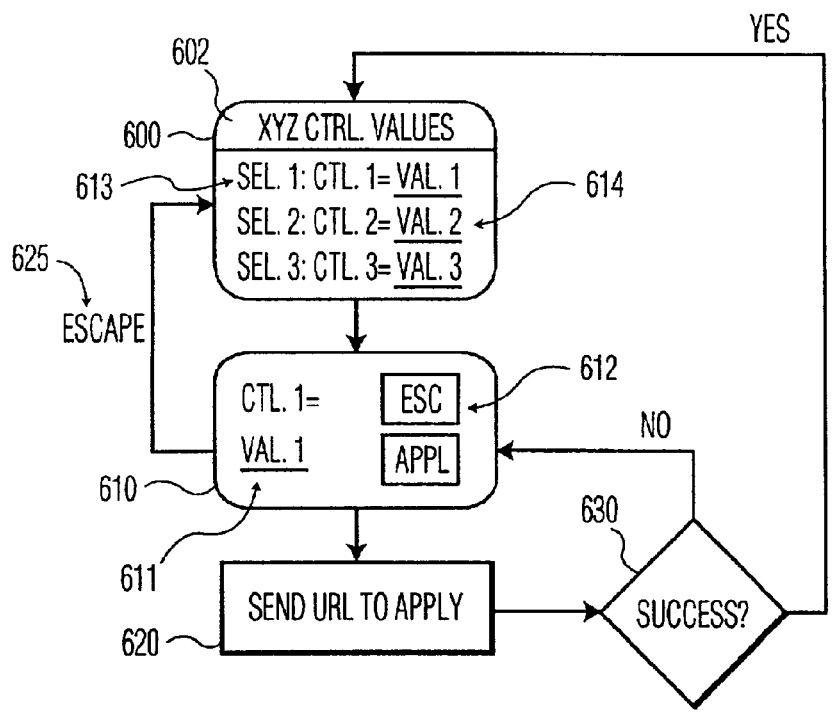
FIG. 5 is a flow chart that shows a sequence of events in navigating single independent parameter modification screens on a wireless terminal according to an embodiment of the invention.

Referring to FIG. 5, a paradigmatic example of a basic structure for the navigational and display controls (e.g., 613) according to the invention begins with a parameter selection screen 600 which permits selection from among several (in this case, three) parameters of a remote-controlled system to control. A title 602 (a permanent display control) provides a reference as to the function the user is currently accessing. The user selects one of the parameters from the list and a parameter value selection screen 610 is displayed. In the example, a first control (Ctl. 1) has been selected for modification. Note that while still in the parameter selection screen, the currently-selected values are displayed along with the parameter to be selected for modification. The displayed values may be changed using a selectable soft key type control or entering numbers by pressing numeral keys based on a value-select control 611. Two selectable controls 612 are shown on the parameter value selection screen 610: an escape control (ESC) and an apply control (Appl). The former is normally like the back key in a web browser, which returns to the last web page viewed, but here it is used to abandon the indicated desire to modify the parameter value. The apply control (Appl) is used to send a command to the remote device to control it. If the escape control (ESC) is actuated, the screen that is higher up in the selection hierarchy, in this case the parameter selection screen 600, is displayed. If the apply control (Appl) is actuated, a URL is sent 620 to the embedded web server 125 servicing the remote device and a reply indicating success or failure returned from the embedded web server 125. If successful, the screen at the top of the local hierarchy, the parameter selection screen 600, is displayed and it shows the newly updated values in respective display controls 614.

Figure 6:
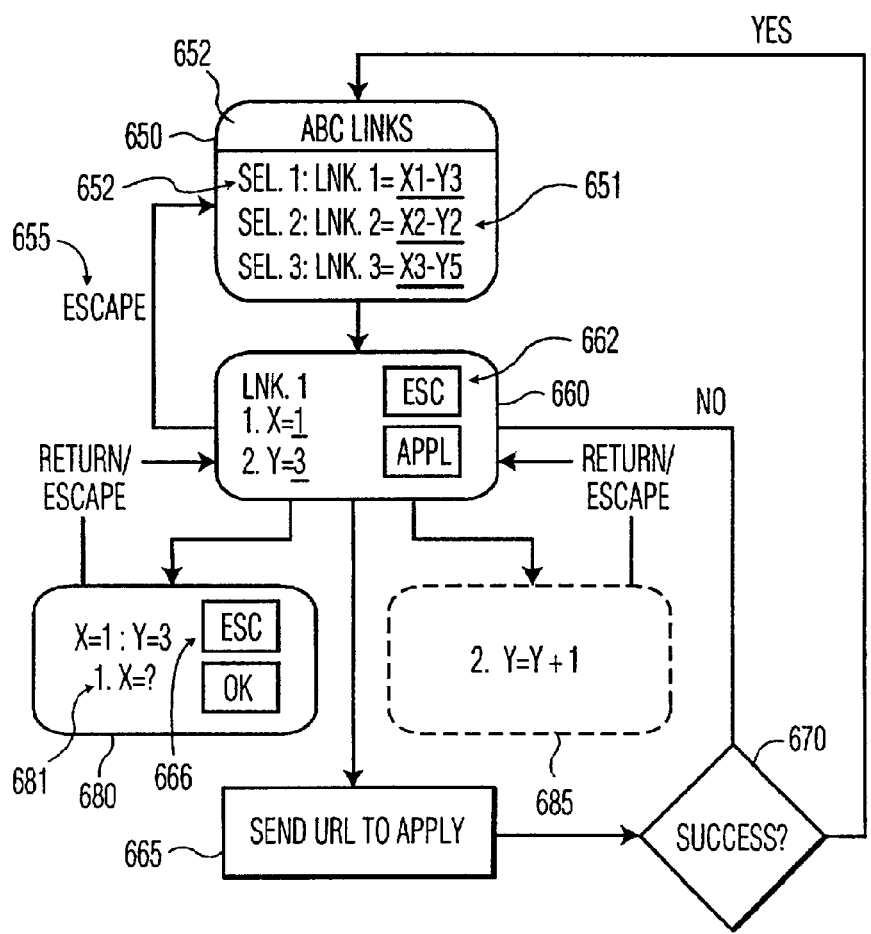
FIG. 6 is a flow chart that shows a sequence of events in navigating linked parameter set modification screens on a wireless terminal according to an embodiment of the invention.

Referring to FIG. 6, in a link selection screen 650, a user is given the option of selecting among controls 651 that correspond not to individual parameters, but to pairs of parameters that are related. A title 652 indicates the function the user is currently accessing. In this case, the parameters are links that are connected by circuits created by a controlled remote switch. The paired variables could be other kinds of ordered or unordered sets of parameters on the equipment to be controlled. Here in the link selection screen, the current values of the inputs and outputs are shown on the screen used to select the one to be modified. The user selects one of the sets to be modified and is presented with an endpoint selection screen 660. In this screen, the user is able to select one of the controlled set for modification. Again, escape and apply controls 662 are provided. Two ways of updating the elements of the set are provided. In one, the value is simply incremented as indicated by the no display screen 685 each time the soft key for the first selection (e.g., the numeral "1" key) is pressed. In the second, a parameter modification screen 680 is displayed. The parameter modification screen 680 contains display control 681. The latter screen has escape (ESC) and acknowledge (OK) keys. The former is used to undo any action and the latter to confirm a change in the parameter. Again, note that escape key always takes the user to the screen that is in the next position up in the menu hierarchy. The transmission of the update URL and the handling of success and failure are similar to the previous embodiment.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A server program to control the display of a software display and controls, for controlling a system, on a wireless terminal, comprising:
   a definition of a procedure for generating a set of display screens each having at least one of a display control, a link control, and a selectable data control;
   a first of said display screens having at least one link control, said at least one link control defining a navigational connection between said first display screen and another display screen;
   said display control displaying data, and said selectable data control permitting entry by a user of data;
   each of said screens being displayable one at a time on said wireless terminal;
   said navigational connection defined by said at least one link control defining a hierarchical structure with branches selectable via said at least one control such that respective screens are displayed depending on selections of an operator of said wireless terminal;
   a second of said display screens containing a selectable data control corresponding to a parameter of said system and display control to display a current value of said parameter;
   said first of said display screens being in an upper echelon with respect said second of said display screens;
   said first of said screens displaying said current value of said parameter, wherein each of said screens containing a selectable control corresponding to a controllable parameter of said system displays a current value of said controllable parameter, and wherein said connections are such that the user may select only said parameter for modification without changing any other parameters, irrespective of how deep in said hierarchy said first screen is located.

2. A program as in claim 1, wherein said first of said screens contains two user-selectable controls at least one of which corresponds to a parameter of said system that may be changed by selecting said at least one to invoke a third of said screens that presents a control to permit a selection of a value for said parameter, first of said screens displaying a current value of said parameter.

3. A server program to control the display of a software display and controls, for controlling a system, on a wireless terminal, comprising:
   a definition of a procedure for generating a set of display screens each having at least one of a display control, a link control, and a selectable data control;
   a first of said display screens having at least one link control, said at least one link control defining a navigational connection between said first display screen and another display screen;
   said display control displaying data, and said selectable data control permitting entry by a user of data;
   each of said screens being displayable one at a time on said wireless terminal;
   said navigational connection defined by said at least one link control defining a hierarchical structure with branches selectable via said at least one control such that respective screens are displayed depending on selections of an operator of said wireless terminal;
   a second of said display screens containing a selectable data control corresponding to a parameter of said system and display control to display a current value of said parameter;
   said first of said display screens being in an upper echelon with respect said second of said display screens;
   said first of said screens displaying said current value of said parameter, wherein a navigational procedure is defined with respect to said first screen that provides an escape control to be selected to permit the user to avoid changing a current value of said parameter, an effect of said navigational procedure invoked by said escape control being such as replace said first screen with said second screen.

4. A program as in claim 1, wherein a navigational procedure is defined with respect to said first screen that, when the user changes a current value of said parameter, an effect of said navigational procedure is to replace said first screen with said second screen.

5. A program as in claim 1, wherein a navigational procedure is defined with respect to said second screen whose effect is to return to a highest level screen in said set hierarchy when said system parameters changed by said user during an activation of said first screen are transmitted to said system.

6. A method of controlling a base device from a wireless terminal connected to receive data from a wireless server, comprising the steps of:
   displaying on a first screen first and second link controls permitting modification of respective first and second parameters of said base device;
   displaying on said first screen respective current values of said first and second parameters;
   in response to a selection of said first link control, displaying on a second screen a data control permitting modification of said first parameter; and
   displaying on said second screen said current value of said first parameter.

7. A method as in claim 6, further comprising:
   accepting a command to modify said first parameter;
   receiving from said base device a confirmation of a modification of said first parameter;
   displaying said first screen with a new current, value for said first parameter.

8. A method as in claim 6, further comprising:
   said step of displaying on said second screen including displaying a link to a third screen;
   selecting said link and displaying said third screen;
   said third screen displaying a current value of said first parameter and including a control to permit a modification of said third parameter.

9. A method as in claim 8, further comprising:
   actuating an escape control during a display of said third screen and automatically returning to said second screen responsively to said step of actuating.

10. The method of claim 6, wherein said steps of displaying comprise displaying said first screen excluding display of said second screen and displaying said second screen excluding display of said first screen.

11. The method of claim 6, wherein said steps of displaying comprise displaying said first screen and said second screen on said wireless terminal.

* * * * *